(12) United States Patent
Zhao et al.

(10) Patent No.: US 12,529,907 B1
(45) Date of Patent: Jan. 20, 2026

(54) MAGNETIC ADSORPTION TEMPLE REPLACEABLE EYEWEAR

(71) Applicant: Shenzhen Hony OPtical Co., Limited, Shenzhen (CN)

(72) Inventors: Jinbao Zhao, Shenzhen (CN); Jinwei Ni, Shenzhen (CN); Yinzhe Jin, Shenzhen (CN)

(73) Assignee: Shenzhen Hony OPtical Co., Limited, Shenzhen (CN)

( * ) Notice: Subject to any disclaimer, the term of this patent is extended or adjusted under 35 U.S.C. 154(b) by 0 days.

(21) Appl. No.: 19/225,391

(22) Filed: Jun. 2, 2025

Related U.S. Application Data

(63) Continuation of application No. 19/189,403, filed on Apr. 25, 2025.

Foreign Application Priority Data

| | | | |
|---|---|---|---|
| Mar. 17, 2025 | (CN) | .......................... | 202520464461.8 |
| Mar. 17, 2025 | (CN) | .......................... | 202520464463.7 |
| Mar. 25, 2025 | (CN) | .......................... | 202520532333.2 |

(51) Int. Cl.
*G02C 5/14* (2006.01)
*G02C 5/12* (2006.01)
*G02C 11/00* (2006.01)

(52) U.S. Cl.
CPC ............. *G02C 5/146* (2013.01); *G02C 5/122* (2013.01); *G02C 11/10* (2013.01); *G02C 2200/02* (2013.01)

(58) Field of Classification Search
CPC ........ G02C 5/146; G02C 5/122; G02C 11/10; G02C 2200/02
(Continued)

(56) References Cited

U.S. PATENT DOCUMENTS

| | | | |
|---|---|---|---|
| 11,994,753 B1* | 5/2024 | McClendon | ............. G02C 1/06 |
| 2015/0055079 A1* | 2/2015 | Holzer | ................. G02C 5/2218 |
| | | | 351/86 |

(Continued)

*Primary Examiner* — William R Alexander
(74) *Attorney, Agent, or Firm* — Hawaii Patent Services; Nathaniel K. Fedde; Kenton N. Fedde

(57) ABSTRACT

The present invention provides a magnetically adsorption temple replaceable glasses. Since the temples are connected to the installation pieces through the first magnetic pieces, the temples can be quickly disassembled and replaced. The user can easily replace the temples in different occasions or according to needs, thereby improving the flexibility of use. By adopting the cooperation of magnetic connection, the user can easily achieve the docking and separation of the temples and the installation pieces, thereby improving the convenience and operating experience of the user and reducing the damage to the temples. By using the bending pieces and the nose pads, the wearing comfort is increased, which is suitable for people with different face shapes and helps to improve the user's long-term wearing experience. By setting the second magnetic part, it can adsorb and fix not limited to the lens or the glasses frame with the lens, thereby increasing the functionality of the glasses and realizing multiple uses of one mirror. Therefore, the present invention solves the technical problem in the prior art that the temples of smart glasses are easily damaged and inconvenient to disassemble and assemble.

11 Claims, 13 Drawing Sheets

(58) Field of Classification Search
USPC .................................. 351/111, 116, 119, 121
See application file for complete search history.

(56) References Cited

U.S. PATENT DOCUMENTS

| | | | | |
|---|---|---|---|---|
| 2015/0309331 | A1* | 10/2015 | Poole | G02C 5/146 |
| | | | | 351/116 |
| 2017/0045754 | A1* | 2/2017 | Rubaud | G02C 5/2272 |
| 2022/0075207 | A1* | 3/2022 | White | G02C 5/2209 |
| 2023/0029397 | A1* | 1/2023 | Artusi | G02C 5/045 |
| 2023/0030028 | A1* | 2/2023 | Buricca | G02C 5/2209 |
| 2023/0194900 | A1* | 6/2023 | Landeros | G02C 5/146 |
| | | | | 2/15 |
| 2023/0393420 | A1* | 12/2023 | Gordon | G02C 11/02 |
| 2023/0393421 | A1* | 12/2023 | Chay | G02C 5/146 |
| 2023/0400711 | A1* | 12/2023 | Kocalar | G02C 11/10 |
| 2025/0130439 | A1* | 4/2025 | Yliluoma | H01R 13/6205 |

* cited by examiner

MAGNETIC ADSORPTION TEMPLE REPLACEABLE EYEWEAR

CROSS-REFERENCE

This application claims the benefit of priority from China Patent Application No. CN2025204644637 filed on Mar. 17, 2025, CN2025204644618 filed on Mar. 17, 2025 and CN2025205323332 filed on Mar. 25, 2025, the contents of which are hereby incorporated by reference in their entirety. This application is a continuation of U.S. patent application Ser. No. 19/189,403 filed 2025 Apr. 25, the contents of which are hereby incorporated by reference in their entirety.

TECHNICAL FIELD

The present invention relates to the technical field of temple replacement, especially a magnetic adsorption temple replaceable eyewear.

BACKGROUND TECHNOLOGY

With the rapid development of intelligent wearable devices, intelligent eyewear becomes a product combing modern technologies and conventional eyeglass functions, and is now an indispensible technological partner in our daily lives. Intelligent eyewear can be useful as being able to serve as audio assistants, provide augmented reality display and monitor health conditions, and is widely used in the field of communication, navigation, entertainment and medical care.

Conventionally, the intelligent eyeglasses are energized by internal batteries, by providing special power cases for the intelligent eyeglasses or integrating charging ports on the eyeglass frames. In order to charge, just take off the temples for spare temples which are not intelligent for use. However, conventional temples are attached and detached to the frames by pins and limiting structures, after long term use, the temples are liable to be damaged and attaching and detaching is not easy.

SUMMARY OF INVENTION

The present invention aims to provide a magnetic adsorption temple replaceable eyewear, in order to address the technical problem that with the intelligent eyewear currently available the temples are liable to be damaged and it is not convenient to detach and install the same.

To this end, the present invention adopts the following technical solution:

A magnetic adsorption temple replaceable eyewear, comprising: a frame and temples, two lenses, bent pieces are provided next to the lenses, and nose pads are installed on the bent pieces;

Installation benches and connection pieces are provided on both ends of the frame, installation pieces are hinged on ends of the connection pieces opposite to the installation benches, the installation pieces are connected with the temples via first magnetic pieces, and second magnetic pieces are installed in the installation benches.

Optionally, insertion bosses are provided at ends of the temples close to the frame, and cavities are opened in the installation pieces for engaging with the insertion bosses;

At least one sliding slot is provided in the insertion bosses, at least one sliding rail corresponding to the at least one sliding slot is provided in the cavities, and the installation pieces and the at least one sliding rail are integrally formed; and balls are provided in between the insertion bosses and the installation pieces.

Optionally, at least one first installation slot communicated with the cavities is provided in the installation pieces, the first magnetic pieces are installed in the at least one first installation slot and the first magnetic pieces are connected with the temples via magnetic adsorption.

Optionally, second installation slots are opened in the insertion bosses, and the first magnetic pieces magnetically connected with the installation pieces are installed in the second installation slots.

Optionally, second protruding pieces abutting against the first magnetic pieces are provided in the insertion bosses, and the second protruding pieces are integrally provided in the insertion bosses and the second protruding pieces are installed in the second installation slots.

Optionally, the installation pieces are provided with cavities, and first magnetic pieces are installed in the cavities; ends of the temples are provided with buckles magnetically connected with the first magnetic pieces, holes for engaging with the buckles are provided in the installation pieces and the holes are communicated with the cavities and outer surfaces of the installation pieces.

Optionally, the buckles comprise first connection portions, second connection portions and joints, wherein the first connection portions, the second connection portions and the joints are integral structures;

Wherein the first connection portions are inserted in the cavities, and are connected with the first magnetic pieces via magnetic adsorption, the joints are provided in the holes and the second connection portions are provided in ends of the temples.

Optionally, first notches are provided in the first connection portions, and first arc surfaces and second arc surfaces are provided in the joints along directions of being inserted into the cavities.

Optionally, the temples comprise first casings of the cavities, second casing for closing the cavities are connected on the first casings, and at least one control panel and at least one battery having signal communications are installed in the cavities.

Optionally, the installation pieces have cavities, first installation slots communicated with the cavities are opened in the installation pieces, insertion bosses inserted into the cavities are provided at ends of the temples and second installation sots corresponding to the first installation slots are opened in the insertion bosses;

First magnetic pieces are installation in the first installation slots and the second installation slots and the two first installation slots are connected via magnetic adsorption.

Optionally, limiting grooves communicated with the cavities are opened in the installation pieces and fourth installation slots corresponding to the limiting grooves are opened in the insertion bosses;

Sleeves are installed in the fourth installation grooves, balls and springs are installation in the sleeves and the balls are inserted into the limiting grooves.

Compared with the prior art, the present invention has the following beneficial effects:

The present invention provides a magnetic adsorption temple replaceable eyewear, as the temples are connected with the installation pieces via the first magnetic pieces, quick detachment and replacement of the temples can be realized, users can replace the temples in different places or conditions conveniently, use flexibility is improved. By cooperation of magnetic connection, uses can connect and disconnect the temples and the installation pieces easily, usage convenience and experience is improved and damages to the temples are reduced. By cooperation of the bent pieces and the nose pads, wearing comfort is enhanced, people having different facial forms can be accommodated and long term wearing experience can be improved. By configuration of the second magnetic pieces, frames with or without lenses can be adsorbed, functionality of the eyewear is improved and the eyewear can be used for different purposes. Therefore, the technical problem that the temples of the intelligent eyeglasses are liable to be damaged and it is not easy to detach and assemble the temples in the prior art has been solved.

BRIEF DESCRIPTION OF DRAWINGS

To illustrate the technical solutions in embodiments of the present invention or the prior art to a better extent, hereinafter drawings to be used in the description of the embodiments and the prior art will be briefly explained, apparently, the drawings given here show only some embodiments of the present invention, and for those of ordinary skill in the art, without paying creative effort, it is still possible to obtain other drawings based on the drawings provided here.

Structures, ratios and dimensions drawn in the drawings of the present invention are intended to describe the contents of the present invention for those skilled in the art to understand and read, rather than intending to limit conditions for implementation of the present invention, and do not have technical essences, without influencing functions of the present invention or purposes achieved by the present invention, all structural modifications, changes of ratios and relationships or dimension changes shall fall into the scope disclosed in the present invention.

Numerical marks in the drawings are.

Figure 1:
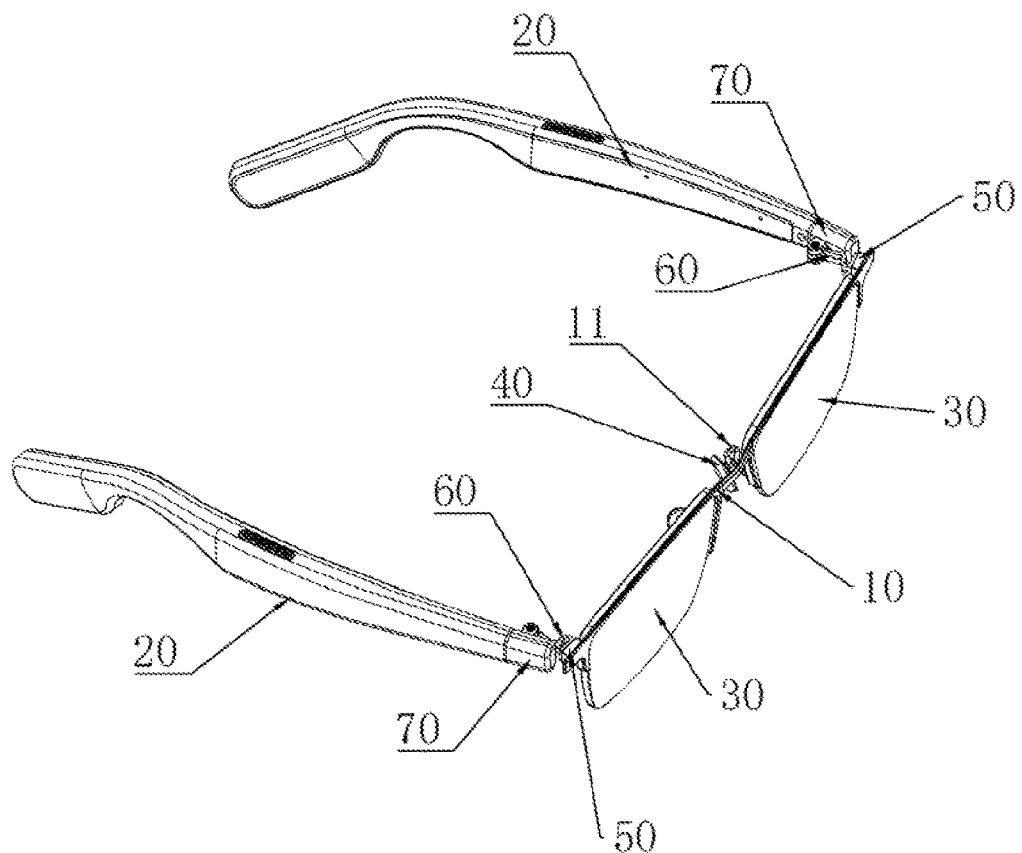
FIG. 1 is a schematic structural diagram showing an isometric structure of a first magnetic adsorption temple replaceable eyewear disclosed in an embodiment of the present invention.
Figure 2:
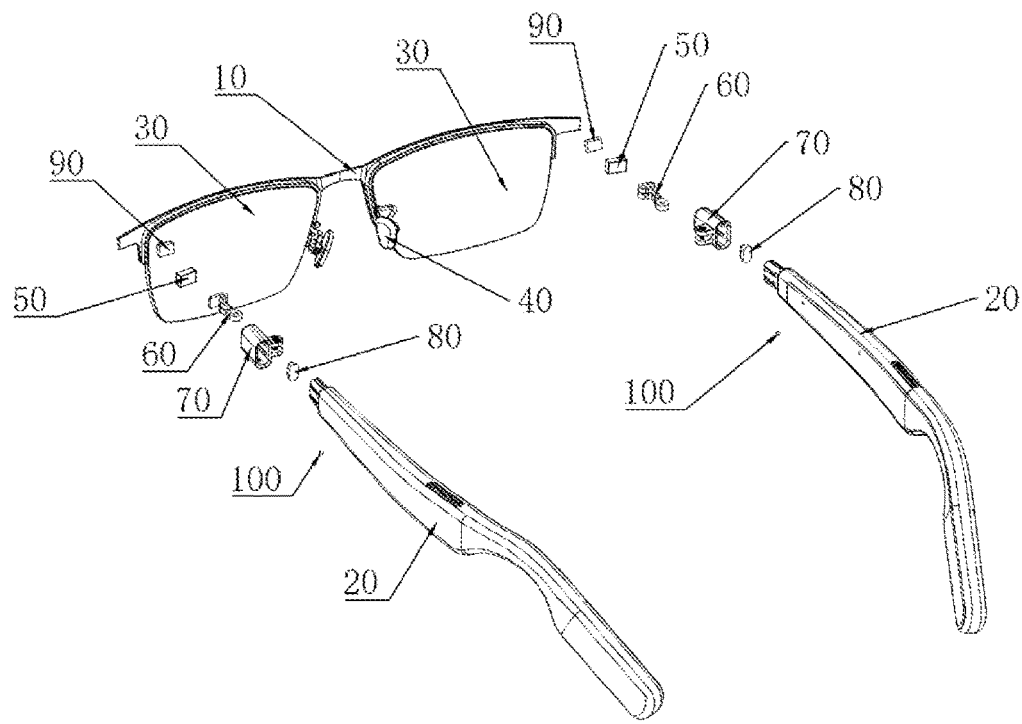
FIG. 2 is a schematic structural diagram showing an exploded structure of the first magnetic adsorption temple replaceable eyewear disclosed in an embodiment of the present invention.
Figure 3:
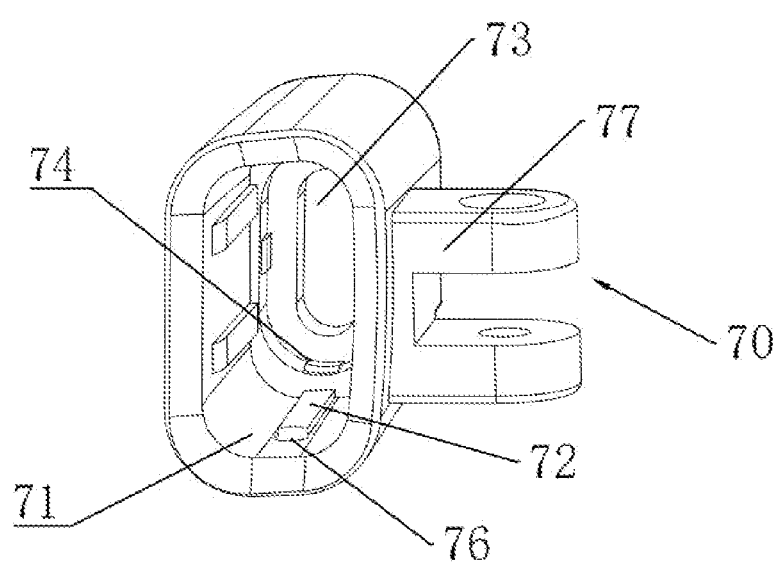
FIG. 3 is a schematic structural diagram showing installation pieces of the first magnetic adsorption temple replaceable eyewear disclosed in an embodiment of the present invention.
Figure 4:
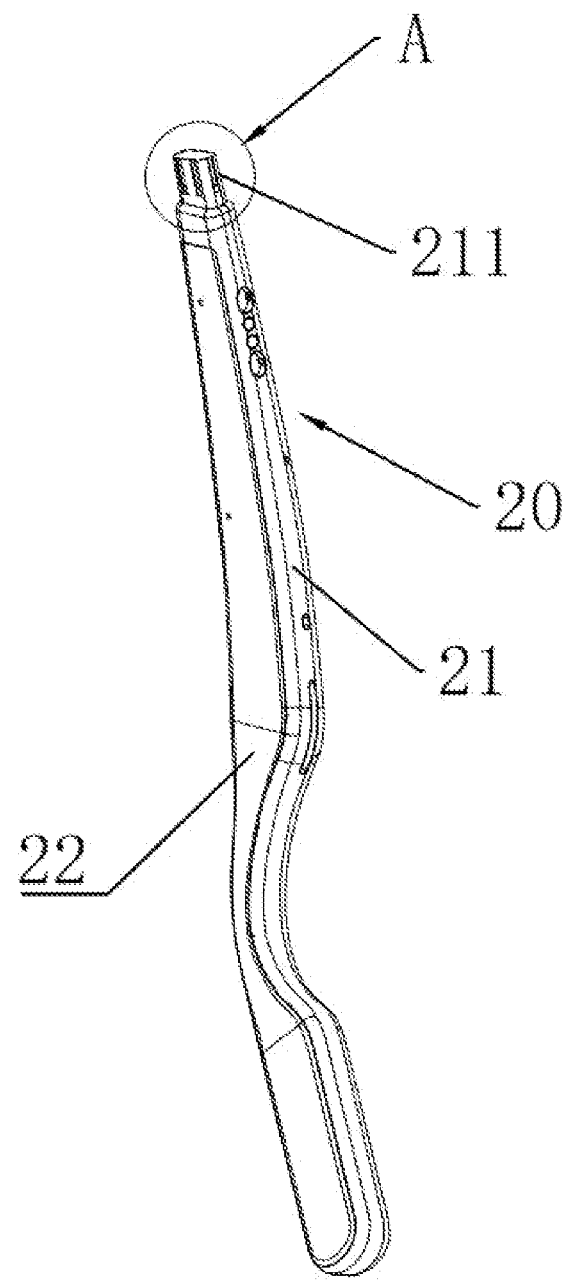
FIG. 4 is a schematic structural diagram showing temples of the first magnetic adsorption temple replaceable eyewear disclosed in an embodiment of the present invention.
Figure 5:
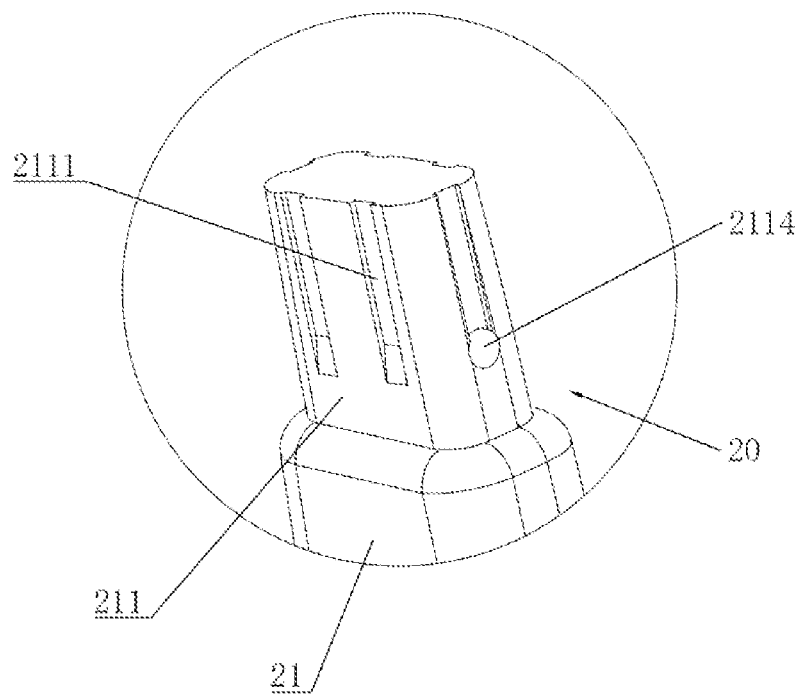
FIG. 5 is a schematic structural diagram showing an enlarged structure in a part A in FIG. 4.
Figure 6:
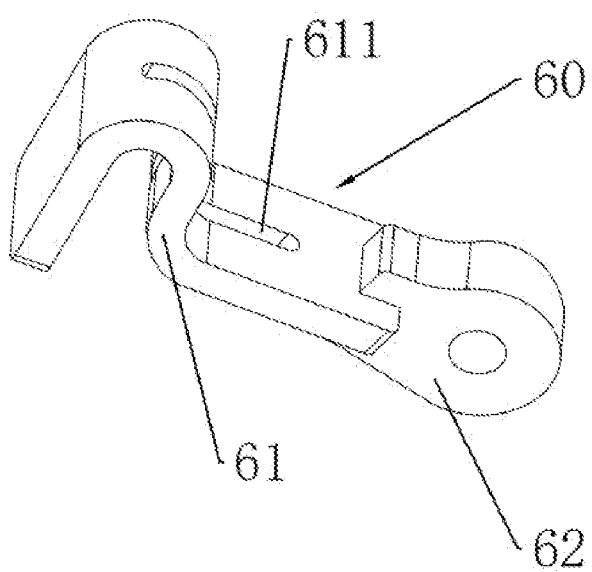
FIG. 6 is a schematic structural diagram showing connection pieces disclosed in an embodiment of the present invention.
Figure 7:
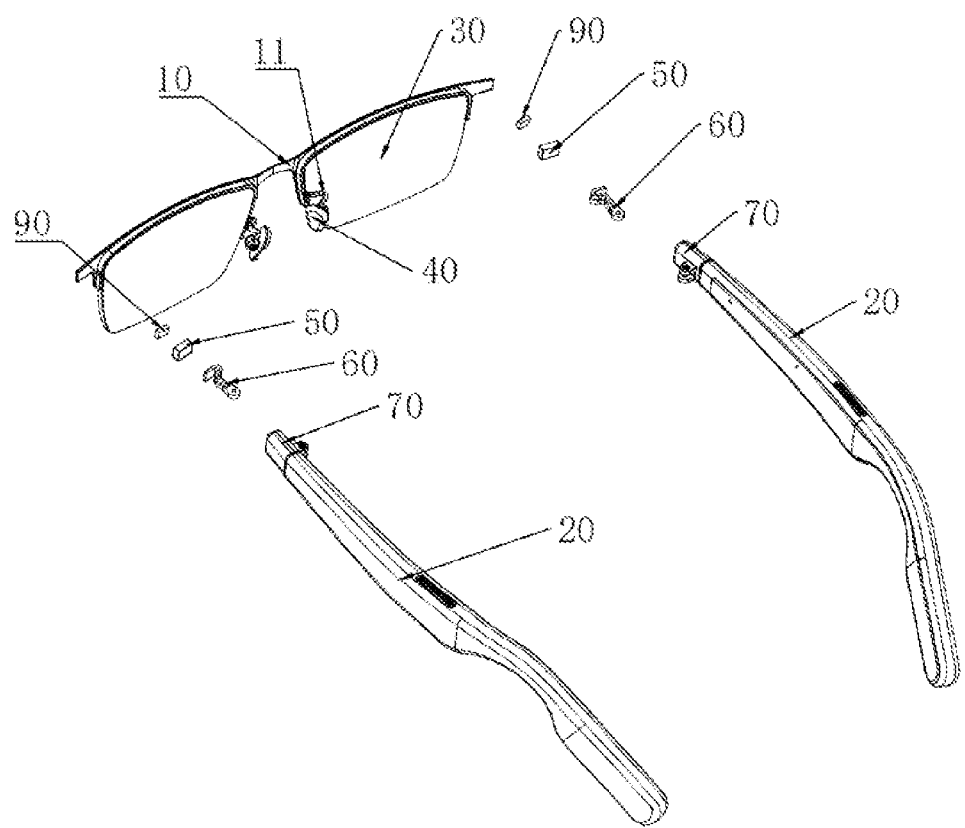
FIG. 7 is a schematic structural diagram showing an exploded structure of a second magnetic adsorption temple replaceable eyewear disclosed in an embodiment of the present invention.
Figure 8:
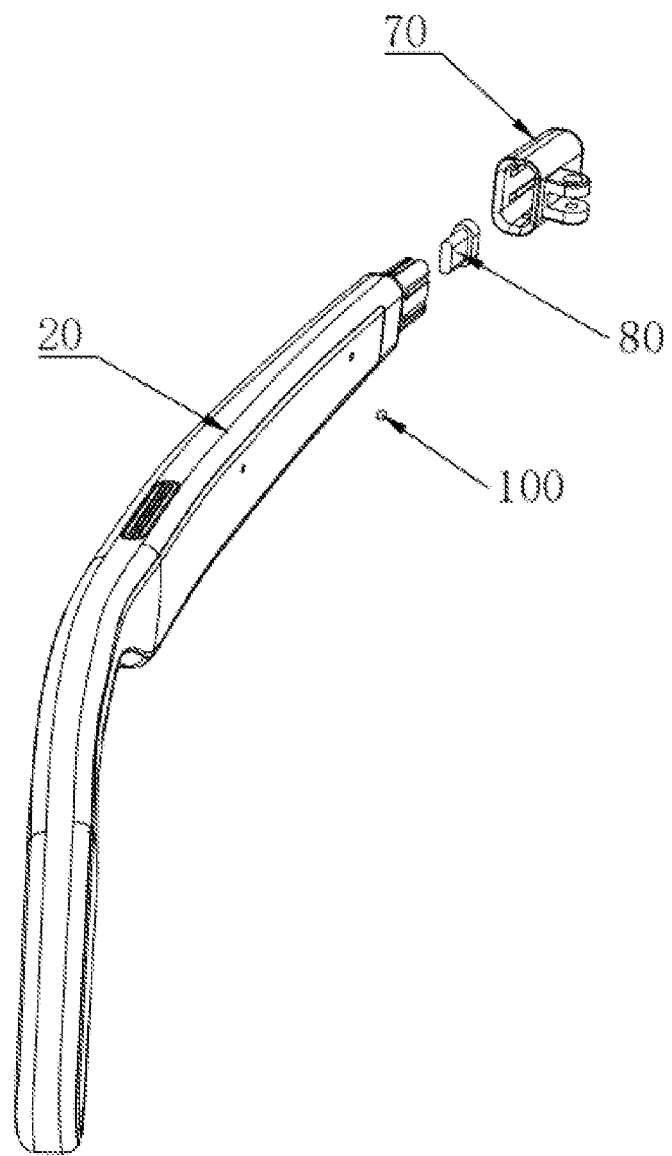
FIG. 8 is a schematic structural diagram showing local exploded structures of the second magnetic adsorption temple replaceable eyewear disclosed in an embodiment of the present invention.
Figure 9:
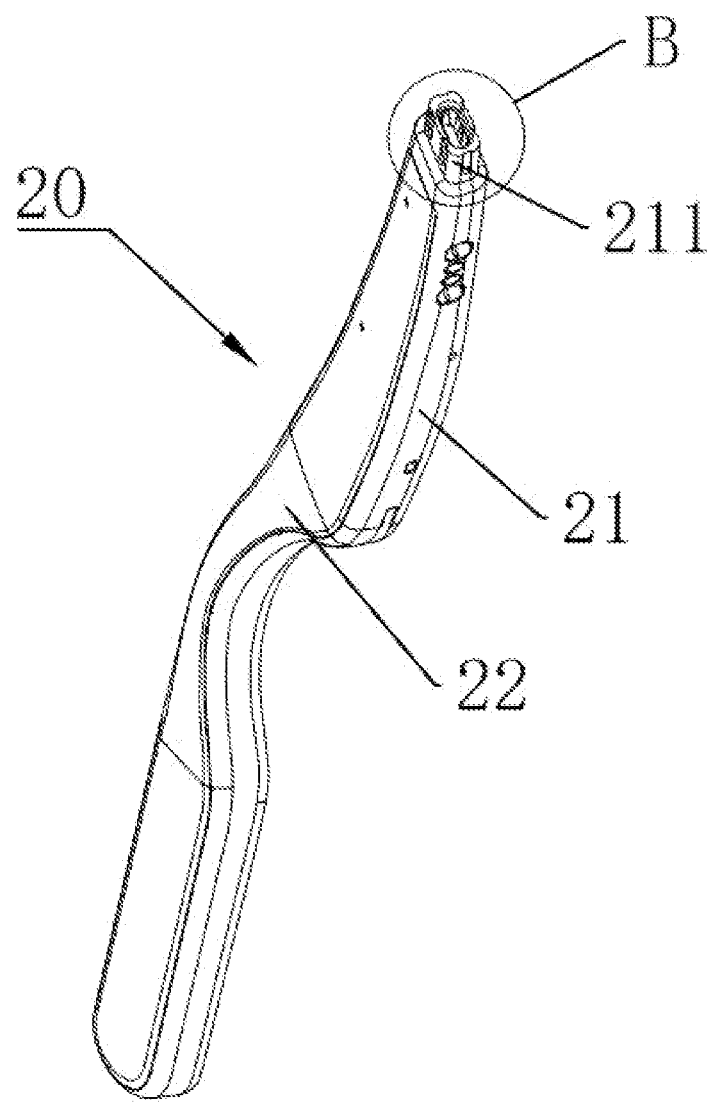
FIG. 9 is a schematic structural diagram showing an isometric structure of the second magnetic adsorption temple replaceable eyewear disclosed in an embodiment of the present invention.

10 frame; 11 bent piece; 20 temple; 21 first casing; 211 insertion boss; 2111 sliding slot; 2112 second installation slot; 2113 second protruding piece; 2114 limiting slot; 2115 fourth installation slot; 22 second casing; 30 lens; 40 nose pad; 50 installation bench; 51 third installation slot; 60 connection piece; 61 bent portion; 611 bent hole; 62 first hinging seat; 70 installation piece; 71 cavity; 72 sliding rail; 73 first installation slot; 74 first protruding piece; 75 opening; 76 limiting hole; 77 second hinging seat; 78 limiting groove; 80 first magnetic piece; 90 second magnetic piece; 100 ball; 200 buckle; 210 first connection portion; 2101 first notch; 220 second connection portion; 230 joint; 231 first arc surface; 232 second arc surface; 300 sleeve; and 400 spring.

EMBODIMENTS

In order to make purposes, features and advantages of the present invention more apparent and apprehensible, hereinafter a clear and complete description to the technical solutions of the embodiments of the present invention will be given in conjunction with the drawings of the embodiments of the present invention, apparently, the embodiments given here are only some embodiments of the present invention rather than all. Based on the embodiments of the present invention, all other embodiments made by those of ordinary skill in the art without paying creative effort fall into the protection scope of the present invention.

In the description of the present invention, it shall be understood that, positional or directional relationships indicated by terms "upper", "lower", "top", "bottom", "inner" and "outer" show positional or directional relationships based on the drawings, and are employed to ease description and make it convenient to describe the present invention rather than indicating or implying that the device or element must have specific direction, be made or operated in a specific direction and shall not be construed as limitations on the present invention. it shall be noted that, where a part is deemed to be "connected" with another part, it can be directly connected to another part or an intermediate part may exist.

Hereinafter the technical solution of the present invention will be further explained in conjunction with the drawings by embodiments.

An embodiment of the present invention provides a magnetic adsorption temple replaceable eyewear, as shown in FIGS. 1-15, comprising, a frame 10 and temples 20, two lenses 30 are installed on the frame 10, bent pieces adjacent to the lenses are provided on the frame 10 and nose pads 40 are installed on the bent pieces 11; Installation benches 50 and connection pieces 60 are connected on both ends of the frame 10, installation pieces 70 are hinged on ends of the connection pieces 60 opposite to the installation benches 50, the installation pieces 70 are connected to the temples 20 via first magnetic pieces 80 via magnetic adsorption and second magnetic pieces 90 are installed in the installation benches 50. In the present embodiment, the second magnetic pieces 90 are configured to adsorb extended lenses 30 or frame 10, and by configuration of the second magnetic pieces 90, functions of the eyewear can be expanded and multiple uses of the eyewear can be realized. Both the first magnetic pieces 80 and the second magnetic pieces 90 are magnets. The frame 10 and the installation benches 50 are connected by laser welding, and the installation benches 50 and the connection pieces 60 are fixed by laser welding. Third installation slots 51 for housing the second magnetic pieces 90 are provided in the installation benches 50. The connection pieces 60 comprise integrally formed bent portions 61 and first hinging seats 62, bent holes 611 are opened in the bent portions 61, and second hinging seats 77 engaging with the first hinging seats 62 are provided on the installation pieces 70. By cooperation of the bent portions 61 and the bent holes 611, flexibility of the connection pieces 60 can be improved and the temples 20 can be bent conveniently.

It shall be noted that, the present invention provides a magnetic adsorption temple replaceable eyewear, as the temples 20 are connected with the installation pieces 70 via the first magnetic pieces 80, quick detachment and replacement of the temples 20 is realized, replacement of the temples 20 can be done conveniently in different conditions or cases, and use flexibility is improved. By cooperation of magnetic adsorption, users can realize connection and disconnection of the temples 20 and the installation pieces 70 easily, use convenience and operation experience is improved and damages to the temples 20 are reduced. By cooperation of the bent pieces 11 and the nose pads 40, wearing comfort is increased, people of different facial forms can be adapted to, and long term wearing experience can be enhanced. By configuration of the second magnetic pieces 90, frames having lenses 30 or not having lenses 30 can be adsorbed, functionality of the eyewear can be increased and multiple uses of the eyewear can be realized. Therefore, the technical problem that the temples 20 of the intelligent eyewear in the prior art are liable to damage and it is not convenient to detach the same has been addressed.

As shown in FIGS. 1-10, insertion bosses 211 are provided at ends of the temples 20 close to the frame 10, and cavities 71 for cooperation with the insertion bosses 211 via insertion are opened in the installation pieces 70; at least one sliding slot 2111 is provided in the insertion bosses 211, sliding rails 72 corresponding to the at least one sliding slot 2111 are provided in the cavities 71, and the installation pieces 70 and the sliding rails 72 are integrally formed; and balls 100 are provided in between the insertion bosses 211 and the installation pieces 70. During implementation, a number of the at least one sliding slot 2111 is configured to be more than one, and distributed along a circumferential direction of the insertion bosses 211. During implementation, limiting slots 2114 for limiting the balls 100 are provided on the insertion bosses 211, and limiting holes 76 communicated with the cavities are provided in the installation pieces 70. Where the temples 20 are inserted into the cavities 71 of the installation pieces 70, the sliding rails 72 cooperates with the sliding slots 2111 via sliding, the balls 100 roll along surfaces of the cavities 71, and thereafter the balls 100 enter the limiting holes 76 to limit the temples 20. It shall be noted that, by cooperation of the sliding rails 72 and the sliding slots 2111, connection stability can be effectively improved. By guiding the installation pieces 70 to slide along a predetermined rail using the sliding rails 72, no displacement or misalignment will occur during use, and accidents due to misalignment can be avoided. And by providing the balls 100 in between the insertion bosses 211 and the installation pieces 70, friction can be reduced, insertion and removal of the temples 20 can be smooth, operation smoothness can be improved, jamming that may occur during use is avoided, and overall wearing comfort is improved. Due to the use of the balls 100, friction and wearing can be reduced and damages to the connection portions of the temples 20 can be reduced too.

As shown in FIGS. 1-6, first installation slots 73 communicated with the cavities 71 are provided in the installation pieces 70, the first magnetic pieces 80 are installed in the first installation slots 73, and the first magnetic pieces 80 are connected with the temples 20 via magnetic adsorption. In the present embodiment, cross sections of the first installation slots 73 and the first magnetic pieces 80 are T-shaped. To realize magnetic adsorption connection between the first magnetic pieces 80 and the temples 20, the temples 20 can be made by magnetic materials or magnets for adsorbing the first magnetic pieces 80 can be installed in the temples 20. It shall be noted that, T-shaped cross sections can have higher contact surfaces, the first magnetic pieces 80 can be more firm in the first installation slots 73, and the first magnetic pieces 80 can enter the first installation slots 73 and be fixed. Users can select different temples 20 as per actual demands for personalized fabrication.

As shown in FIGS. 1-6, first protruding pieces 74 abutted against the first magnetic pieces 80 are provided on the installation pieces 70, and the first protruding pieces 74 are integrally formed with the installation pieces 70 and the first protruding pieces 74 are located in the first installation slots 73.

It shall be noted that, with the integral structure, the strength and resilience of the first protruding pieces 74 and the installation pieces 70 can be increase, stress and impact during daily use can be borne to a better extent and usage life of the entire assembly can be prolonged. By abutting the first protruding pieces 74 on the first magnetic pieces 80, installation of the first magnetic pieces 80 can be firmer. As shown in FIGS. 7-10, second installation slots 2112 are opened in the insertion bosses 211, and the first magnetic pieces 80 magnetically connected with the installation pieces 70 are installed in the second installation slots 2112. During implementation, the installation pieces 70 are made from magnetic materials, such as steel, cobalt, nickel ec. Cross sections of the second installation slots 2112 and the first magnetic pieces 80 are T-shaped.

It shall be noted that, with the configuration of the T-shaped cross sections, higher contact surfaces are provided, and contact strength between the second installation slots 2112 and the first magnetic pieces 80 can be effectively enhanced. In this way, magnetic connection stability can be improved and can bear repeated external forces without loosening during daily use. As the installation pieces 70 are made of magnetic materials, the first magnetic pieces 80 and the installation pieces 70 are magnetically connected, no additional fixing device is required for connecting the entire structure, and quick and firm connection can be realized with magnetic forces only. And with this self-locking design detaching and installation becomes easier and quicker.

Figure 10:
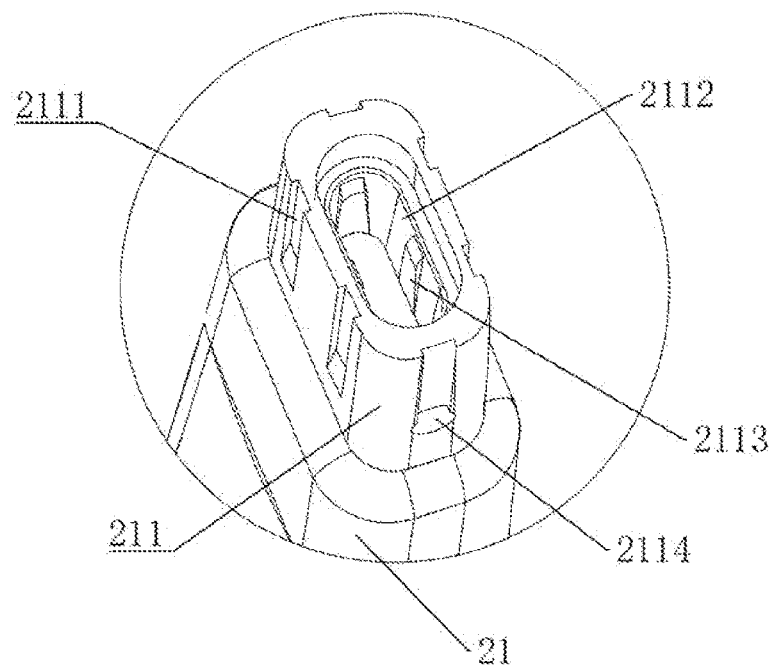
FIG. 10 is a schematic structural diagram showing an enlarged structure of a part B in FIG. 8.
Figure 11:
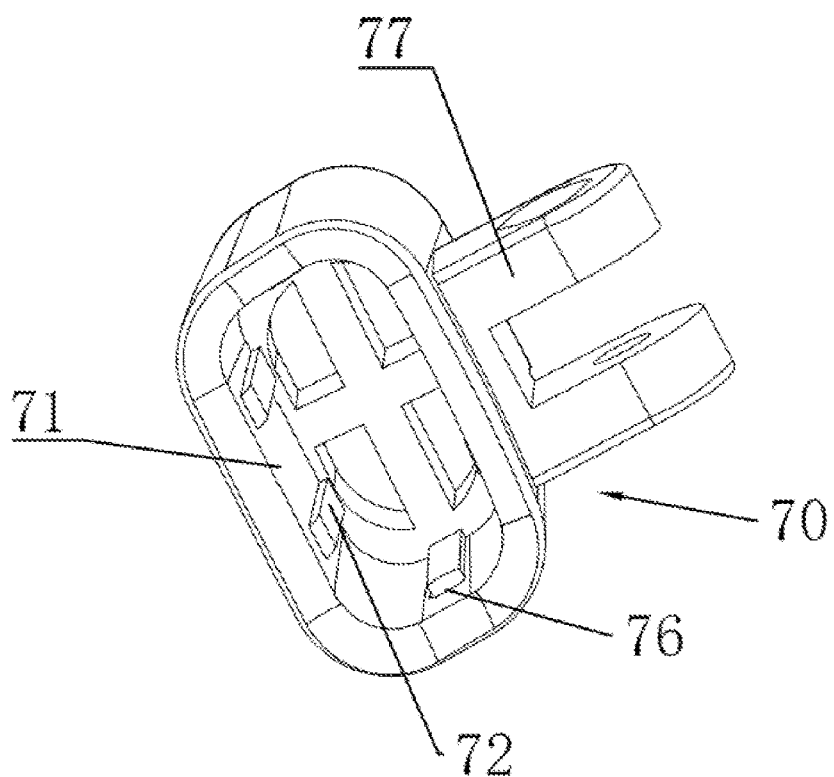
FIG. 11 is a schematic structural diagram showing installation pieces in the second magnetic adsorption temple replaceable eyewear disclosed in an embodiment of the present invention.
Figure 12:
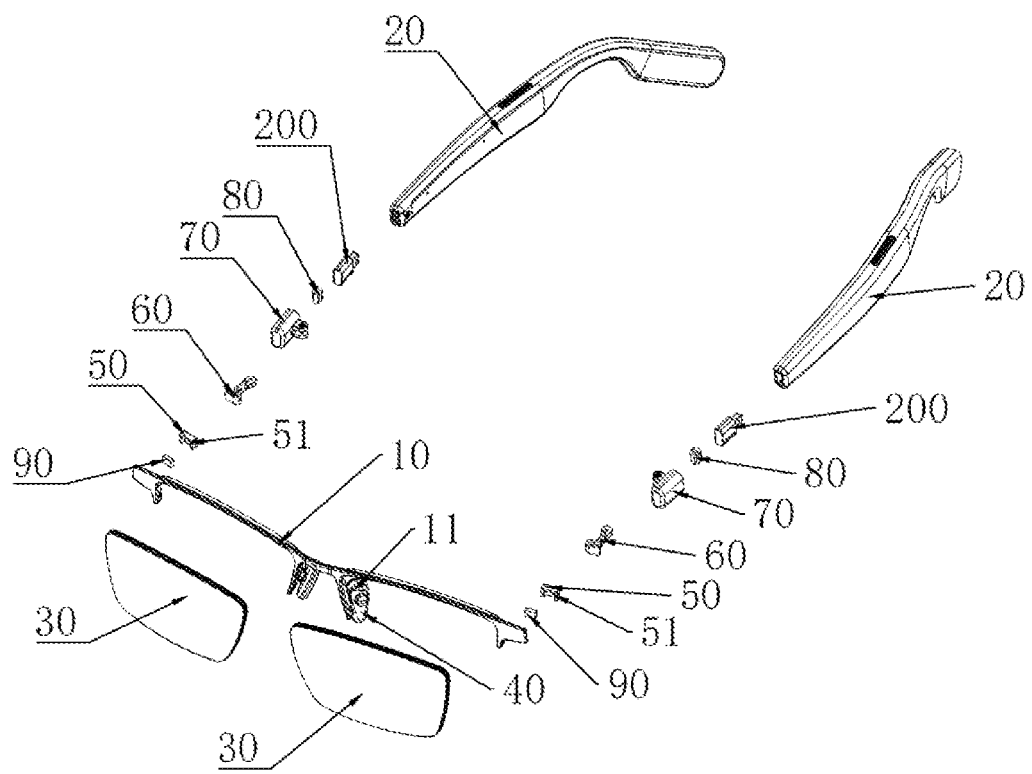
FIG. 12 is a schematic structural diagram showing exploded structures of a third magnetic adsorption temple replaceable eyewear disclosed in an embodiment of the present invention.
Figure 13:
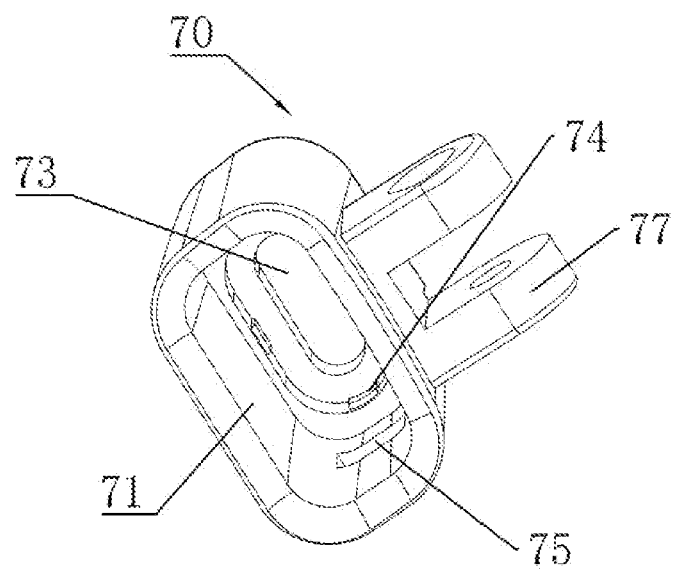
FIG. 13 is a schematic structural diagram showing an isometric structure of the third magnetic adsorption temple replaceable eyewear disclosed in an embodiment of the present invention.
Figure 14:
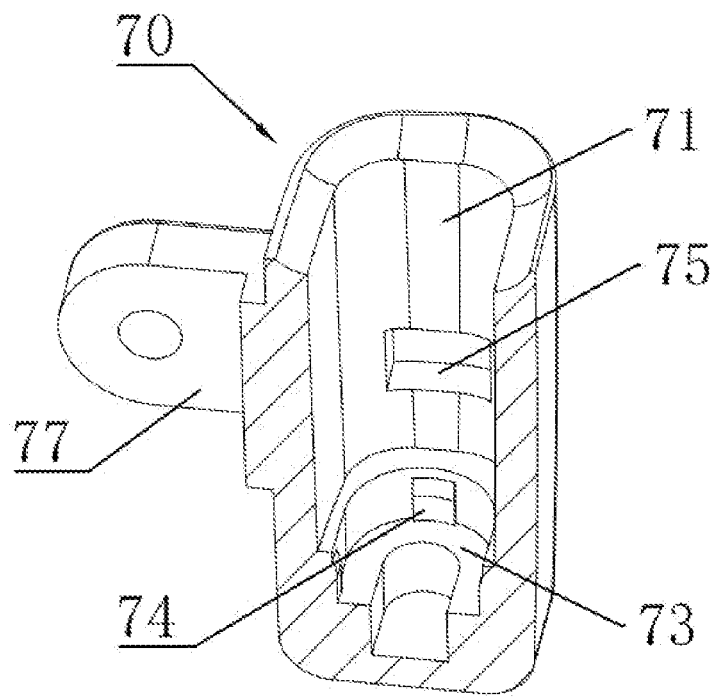
FIG. 14 is a cross-section diagram showing the installation pieces of the third magnetic adsorption temple replaceable eyewear disclosed in an embodiment of the present invention.
Figure 15:
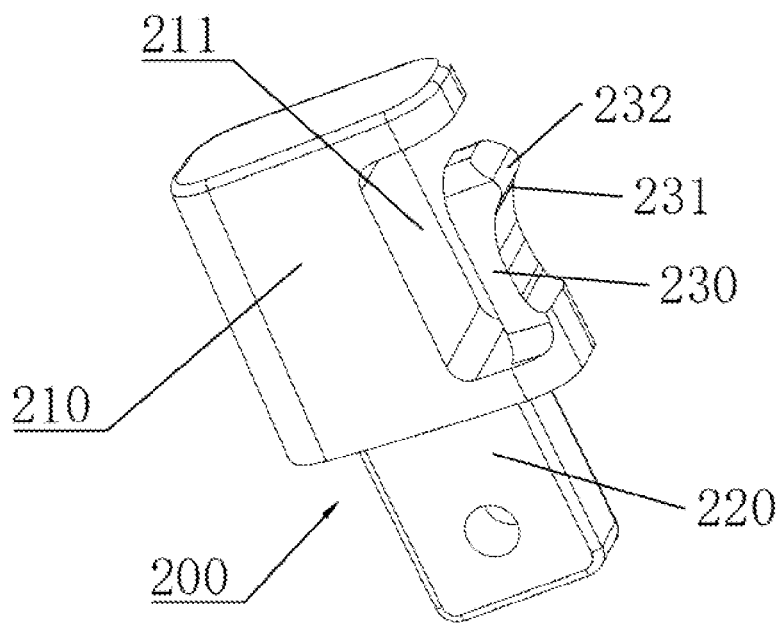
FIG. 15 is a schematic structural diagram showing buckles of the third magnetic adsorption temple replaceable eyewear disclosed in an embodiment of the present invention.
Figure 17:
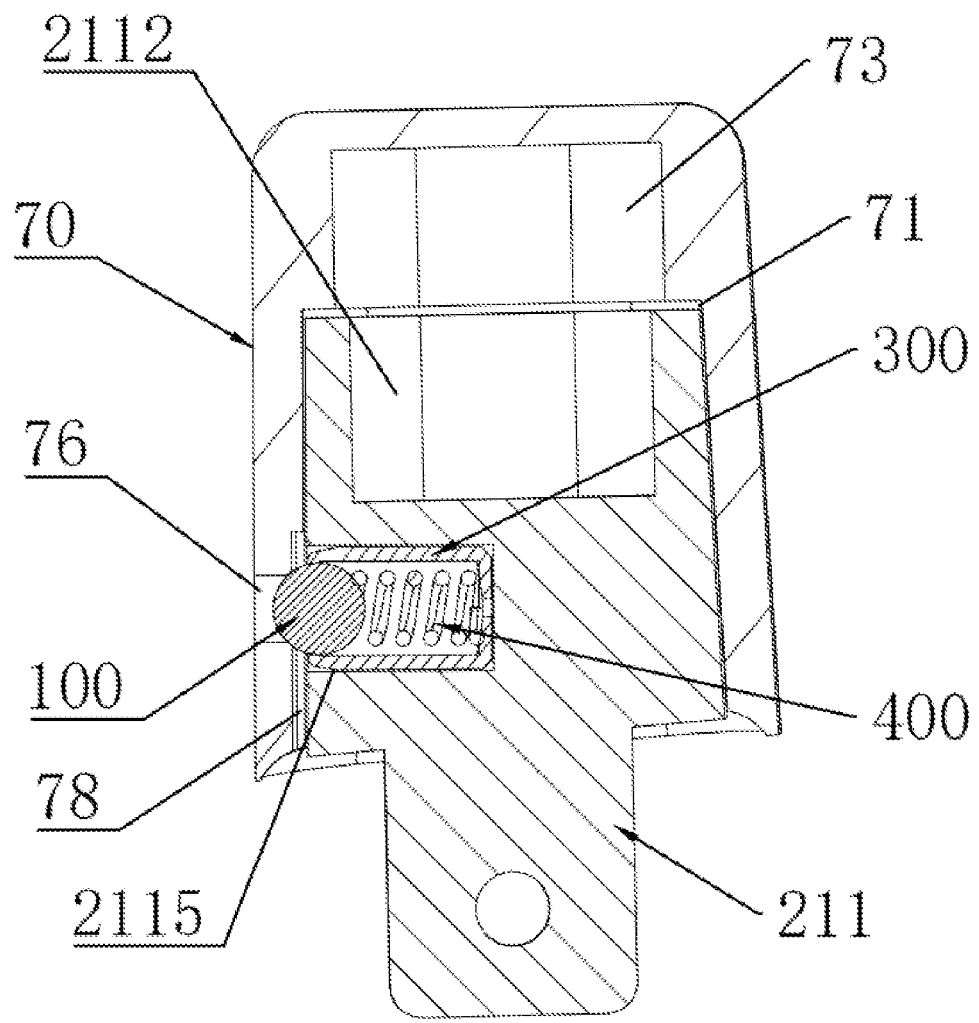
FIG. 17 is a local cross-sectional schematic structural diagram showing the fourth magnetic adsorption temple replaceable eyewear disclosed in an embodiment of the present invention.

As shown in FIGS. 17-10, second protruding pieces 2113 abutted against the first magnetic pieces 80 are provided in the insertion bosses 211, the second protruding pieces 2113 and the insertion bosses 211 are integrally formed and the second protruding pieces 2113 are located in the second installation slots 2112.

It shall be noted that, by fixing the first magnetic pieces 80 with the second protruding pieces 2113, displacement of the first magnetic pieces 80 due to vibration or foreign forces during use can be avoided, magnetic connection between the temples 20 and the installation pieces 70 is constant and usage safety can be promised.

As shown in FIGS. 11-15, the installation pieces 70 have cavities 71, and the first magnetic pieces 80 are installed in the cavities 71; buckles 200 magnetically connected with the first magnetic pieces 80 are installed at ends of the temples 20, openings 75 for engaging with the buckles 200 are provided in the installation pieces 70, and the opening 75 are communicated with the cavities 71 and the installation pieces 70. During implementation, the temples 20 and the buckles 200 are firmly connected using bolts.

It shall be explained that, the magnetic connection between the first magnetic pieces 80 and the buckles 200 can ensure the stability of the temples 20 during use and provide ease during detachment. By engagement between the buckles 200 and the openings 75, connection firmness between the temples 20 and the installation pieces 60 is further improved, and unstable installation of the temples due to reduction of the magnetic performance of the first magnetic pieces 80 can be avoided. By providing the cavities 71 to install the first magnetic pieces 80, space is saved and the structural configuration is smooth. The installation pieces 70 are communicated with the openings 75 of the cavities 71, the structure is compact and appearances of the eyewear are pleasant.

As shown in FIGS. 11-15, the buckles 200 comprise first connection portions 210, second connection portions 220 and joints 230, and the first connection portions 210, the second connection portions 220 and the joints 230 are integral structures; Wherein the first connection portions 210 are inserted in the cavities 71 and connected with the first magnetic pieces 80 via magnetic adsorption, the joints 230 are connected in the openings 75 and the second connection portions 220 are fixed in ends of the temples 20.

It shall be further explained that, by inserting the first connection portions 210 into the cavities 71 and magnetic connection the same with the first magnetic pieces 80, reliable connection between the temples 20 and the installation pieces 70 is promised, goods tensile strength and shear strength is provided, and stresses those may happen during daily use can be handled. The integrally formed buckles 200 have good impact and tensile performance, damages to the buckles 200 due to accidental collision or pressure can be reduced effectively, safety and durability of the product can be improved. The second connection portions 220 are fixed in ends of the temples 20, the joints 230 and the opening 75 engage by connection, therefore, in order to replace the temples 20, users have only to detach and install the buckles 200 without requiring complex tools and replacement ease can be improved.

As shown in FIGS. 11-15, first notches 2101 are provided in the first connection portions 210, and first arc surfaces 231 and second arc surfaces 232 are provided on the joints 230 along direction of insertion into the cavities 71.

It shall be noted that, by configuration of the first notches 2101, space for flexible deformation of the joints 230 is allowed. By configuration of the first arc surfaces 231 and the second arc surfaces 232, connection of the buckles 200 is made smooth due to arc shape configuration, and the joints 230 can enter and exit the openings 75 smoothly.

As shown in FIGS. 1-15, the temples comprise first casings 21 of the cavities 71, second casings 22 for closing the cavities 71 are connected on the first casing 10, and at least one control panel (not shown in the drawings) and at least one battery (not shown in the drawings) having signal communications are installed in the cavities 71. During implementation, the temples 20 can be common temples 20 or intelligent temples 20; by integrating radio and audio functions in the control panel, the intelligent functions of the temples 20 can be increased.

It shall be noted that, the first casings 21 and the second casing 22 are connected by bolts. Design of the temples 20 allows using conventional temples 20 or intelligent temples 20 and product universality is improved. Users can select common temples 20 or temples 20 having intelligent functions as per personal need, and personalized product design is enabled. By including radio and audio functions on the control panel, the temples 20 can have intelligent features. The eyeglasses can not only be used for eyesight correction, but can also serve as intelligent devices to satisfy users' demands on functionality and intelligent products.

Figure 16:
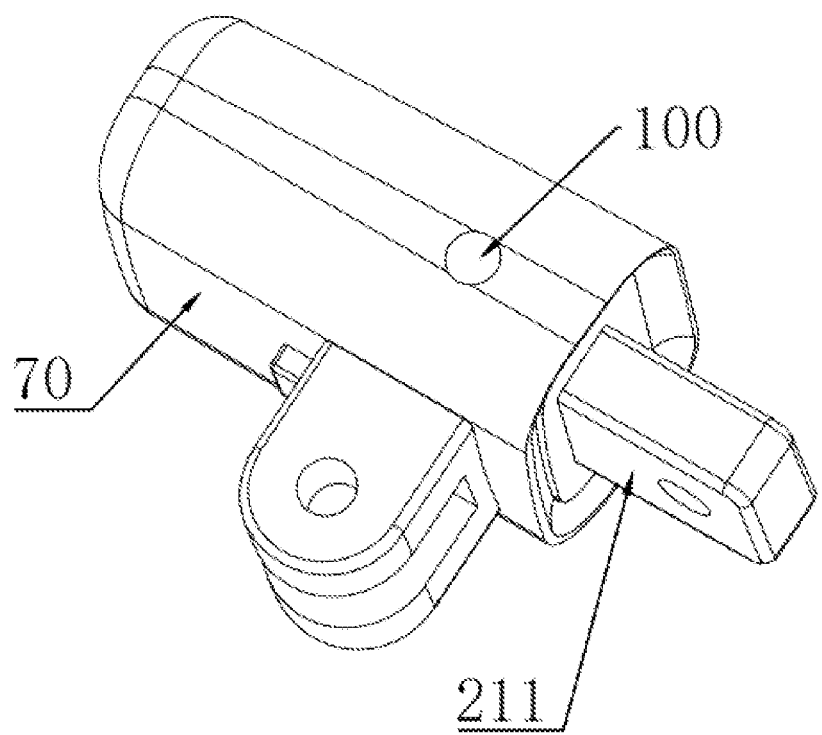
FIG. 16 is a local schematic structural diagram showing a fourth magnetic adsorption temple replaceable eyewear disclosed in an embodiment of the present invention.
Figure 18:
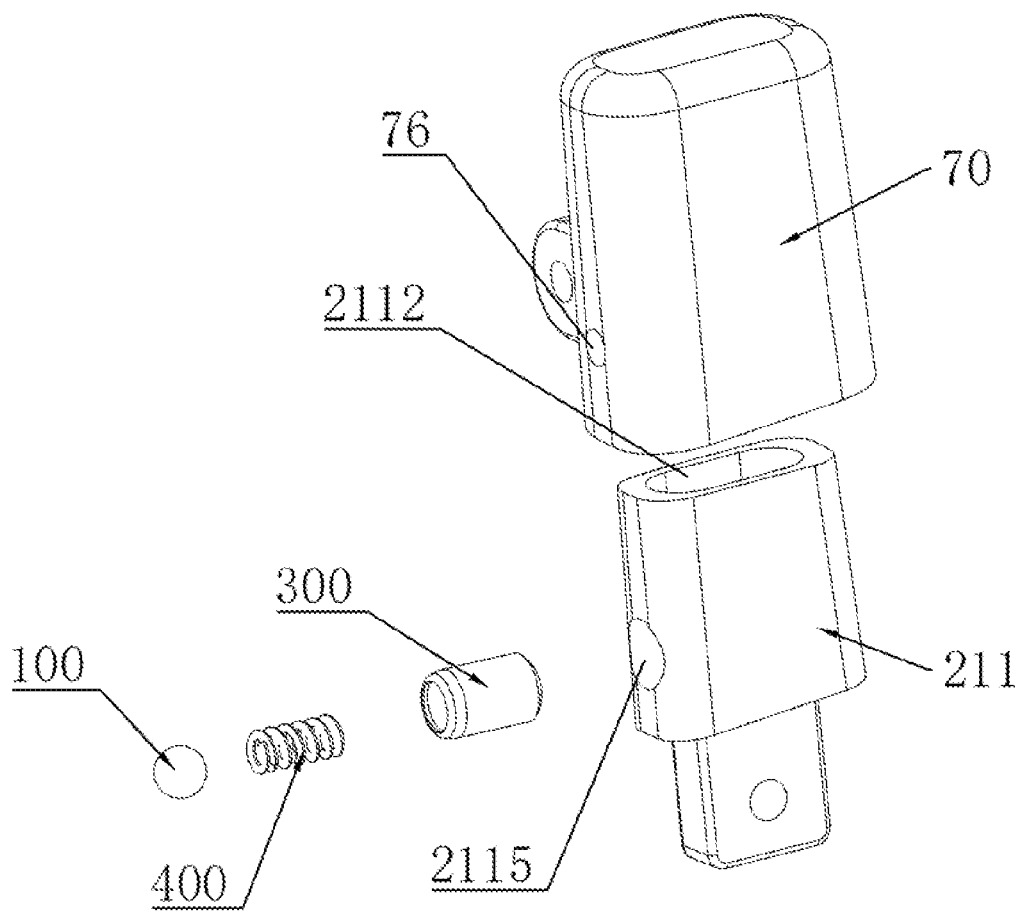
FIG. 18 is a local exploded structural diagram showing the fourth magnetic adsorption temple replaceable eyewear disclosed in an embodiment of the present invention.

As shown in FIGS. 16-18, differences between the fourth magnetic adsorption temple replaceable eyewear disclosed in the present embodiment and the first magnetic adsorption temple replaceable eyewear are that, the installation pieces 70 have cavities 71, first installation slots 73 communicated with the cavities 71 are installed in the installation pieces 70, insertion bosses 211 inserted into the cavities 71 are installed on ends of the temples 20, and second installation slots 2112 corresponding to the first installation slots 73 are opened in the insertion bosses 211; and the insertion bosses 211 are connected with the first casing 21 via bolts;

First magnetic pieces 80 are installed in the first installation slots 73 and the second installation slots 2112, and the two first magnetic pieces 80 are connected via magnetic adsorption.

It shall be noted that, by magnetic adsorption between the two first magnetic pieces 80, the temples 20 and the installation pieces 70 can be firmly connected together, replacement of the temples 20 is more convenient, users can detach or replace the temples 20 quickly and usage flexibility of the eyewear is improved. The insertion bosses 211 and the first casings 21 are firmly connected using bolts, and in this way stability and safety of the temples 20 during use can be promised.

As shown in FIGS. 16-18, limiting grooves 76 communicated with the cavities 71 are opened in the installation pieces 70, and fourth installation slots 2115 corresponding to the limiting groove 76 are opened in the insertion bosses 211;

Sleeves 300 are installed in the fourth installation slots 2115, balls 100 and springs 400 are connected in the sleeves 300, and balls 100 are inserted in the limiting slots 76. During implementation, limiting grooves 78 communicated with the cavities 71 and the limiting holes 76 are provided in the installation pieces 70, and by configuration of the limiting grooves 78, the balls 100 can enter and exit the cavities 71 smoothly. Ends of the springs 400 can be welded and fixed onto the sleeves 300, another ends of the springs 400 can be welded and fixed onto the balls 100, and the sleeves 300 and the fourth installation slots 2115 in the insertion bosses 211 engage by clearance fit.

It shall be noted that, under action of the springs 400, the balls 100 are inserted into the limiting holes 76, connection stability between the temples 20 and the installation pieces 70 can be enhanced, and loosening or instability of the temples 20 can be avoided. By configuration of the limiting grooves 78, the balls 100 can enter and exit the cavities 71 smoothly, and installation and detachment of the temples can be further optimized. Users can detach or replace the temples 20 conveniently, without requiring complex operation steps and usability and operation convenience of the eyewear can be improved.

Working principles: the present invention provides a magnetic adsorption temple replaceable eyewear, by connecting the temples 20 with the installation pieces 70 via the first magnetic pieces 80, quick detachment and replacement of the temples 20 can be realized, users can replace the temples 20 conveniently in different conditions or cases and usage flexibility is improved. By cooperation of magnetic adsorption connection, users can realize connection and disconnection between the temples 20 and the installation piece 70 easily, use convenience and experience can be improved and damages to the temples 20 can be reduced. By cooperation of the bent pieces 11 and the nose pads 50, wearing comfort is increased to accommodate to people having different facial forms, and long term wearing experience can be improved. By configuration of the second magnetic pieces 90, frames 10 having or not having lenses 30 can be fixed, functionality of the eyewear can be increased and multiple use of the eyewear can be achieved. Therefore, the present invention has addressed the technical problem that the temples 20 of the intelligent eyewear in the prior art are liable to be damaged and it is not convenient to detach the same.

The foregoing are only some embodiments for explaining the technical solutions of the present invention rather than limiting the same; although a detailed description has been given to the present invention with reference to the embodiments, those of ordinary skill in the art shall understand that: it is still possible to modify the technical solutions recited in the embodiments, or make equivalent replacement to some technical features therein; and such modifications or replacement do not depart the essence of the technical solutions from the essence and spirit of the technical solutions of the embodiments of the present invention.

The invention claimed is:

1. A magnetic adsorption temple replaceable eyewear, comprising:
   a frame (10) and temples (20), two lenses (30), bent pieces (11) are provided next to the lenses (30), and nose pads (40) are installed on the bent pieces (11);
   installation benches (50) and connection pieces (60) are provided on both ends of the frame (10), installation pieces (70) are hinged on ends of the connection pieces (60) opposite to the installation benches (50), the installation pieces (70) are connected with the temples (20) via first magnetic pieces (80), and second magnetic pieces (90) are installed in the installation benches (50)
   insertion bosses (211) are provided at ends of the temples (10) close to the frame (10), and cavities (71) are opened in the installation pieces (70) for engaging with the insertion bosses (211);
   at least one sliding slot (2111) is provided in the insertion bosses (211), at least one sliding rail (72) corresponding to the at least one sliding slot (2111) is provided in the cavities (71), and the installation pieces (70) and the at least one sliding rail (72) are integrally formed; and
   balls (100) are provided in between the insertion bosses (211) and the installation pieces (70).

2. The magnetic adsorption temple replaceable eyewear according to claim 1, wherein at least one first installation slot (73) communicated with the cavities (71) is provided in the installation pieces (70), the first magnetic pieces (80) are installed in the at least one first installation slot (73) and the first magnetic pieces (80) are connected with the temples (20) via magnetic adsorption.

3. The magnetic adsorption temple replaceable eyewear according to claim 2, wherein first protruding pieces (74) abutting against the first magnetic pieces (80) are provided in the installation pieces (70), and the first protruding pieces (74) are integrally provided in the installation pieces (70) and the first protruding pieces (74) are installed in the first installation slots (73).

4. The magnetic adsorption temple replaceable eyewear according to claim 1, wherein installation slots (2112) are opened in the insertion bosses (211) and the first magnetic pieces (80) magnetically connected with the installation pieces (70) are provided in the installation slots (2112).

5. The magnetic adsorption temple replaceable eyewear according to claim 4, wherein second protruding pieces (2113) abutting against the first magnetic pieces (80) are provided in the insertion bosses (211), and the second protruding pieces (2113) are integrally provided in the insertion bosses (211) and the second protruding pieces (2113) are installed in the installation slots (2112).

6. The magnetic adsorption temple replaceable eyewear according to claim 1, wherein the temples (20) comprise first casings (21) of the cavities (71), second casings (22) for closing the cavities (71) are connected on the frame (20), and at least one control panel and at least one battery having signal communications are installed in the cavities (71).

7. The magnetic adsorption temple replaceable eyewear according to claim 1, limiting grooves (76) communicated with the cavities (71) are opened in the installation pieces (70), third installation slots (2115) corresponding to the limiting grooves (76) are opened in the insertion bosses (211); and
   sleeves (300) are installed in the third installation slots (2115), balls (100) and springs (400) are installed in the sleeves (300) and the balls (200) are inserted in the limiting grooves (76).

8. A magnetic adsorption temple replaceable eyewear, comprising:
   a frame (10) and temples (20), two lenses (30), bent pieces (11) are provided next to the lenses (30), and nose pads (40) are installed on the bent pieces (11);

installation benches (50) and connection pieces (60) are provided on both ends of the frame (10), installation pieces (70) are hinged on ends of the connection pieces (60) opposite to the installation benches (50), the installation pieces (70) are connected with the temples (20) via first magnetic pieces (80), and second magnetic pieces (90) are installed in the installation benches (50), the installation pieces (70) are provided with cavities (71), and the first magnetic pieces (80) are installed in the cavities (71); and ends of the temples (20) are provided with buckles (200) magnetically connected with the first magnetic pieces (80), holes (75) for engaging with the buckles (200) are provided in the installation pieces (70) and the holes (75) are communicated with the cavities (71) and outer surfaces of the installation pieces (70).

9. The magnetic adsorption temple replaceable eyewear according to claim 8, wherein the buckles (200) comprise first connection portions (210), second connection portions (220) and joints (230), wherein the first connection portions (210), the second connection portions (220) and the joints (230) are integral structures;

wherein the first connection portions (210) are inserted in the cavities (71), and are connected with the first magnetic pieces (80) via magnetic adsorption, the joints (230) are provided in the holes (75) and the second connection portions (220) are provided in ends of the temples (20).

10. The magnetic adsorption temple replaceable eyewear according to claim 9, wherein first notches (211) are provided in the first connection portions (210), and first arc surfaces (231) and second arc surfaces (232) are provided in the joints (230) along directions of being inserted into the cavities (71).

11. A magnetic adsorption temple replaceable eyewear, comprising:

a frame (10) and temples (20), two lenses (30), bent pieces (11) are provided next to the lenses (30), and nose pads (40) are installed on the bent pieces (11);

installation benches (50) and connection pieces (60) are provided on both ends of the frame (10), installation pieces (70) are hinged on ends of the connection pieces (60) opposite to the installation benches (50), the installation pieces (70) are connected with the temples (20) via first magnetic pieces (80), and second magnetic pieces (90) are installed in the installation benches (50);

cavities (71) are provided in the installation pieces (70), wherein first installation slots (73) communicated with the cavities (71) are opened in the installation pieces (70), insertion bosses (211) inserted into the cavities (71) are installed in ends of the temples (20) and second installation slots (2112) corresponding to the first installation slots (73) are opened in the insertion bosses (211); and the first magnetic pieces (80) are installed in the first installation slots (73) and the second installation slots (2112) and the first magnetic pieces (80) are connected via magnetic adsorption.

\* \* \* \* \*